United States Patent Office 3,425,140
Patented Feb. 4, 1969

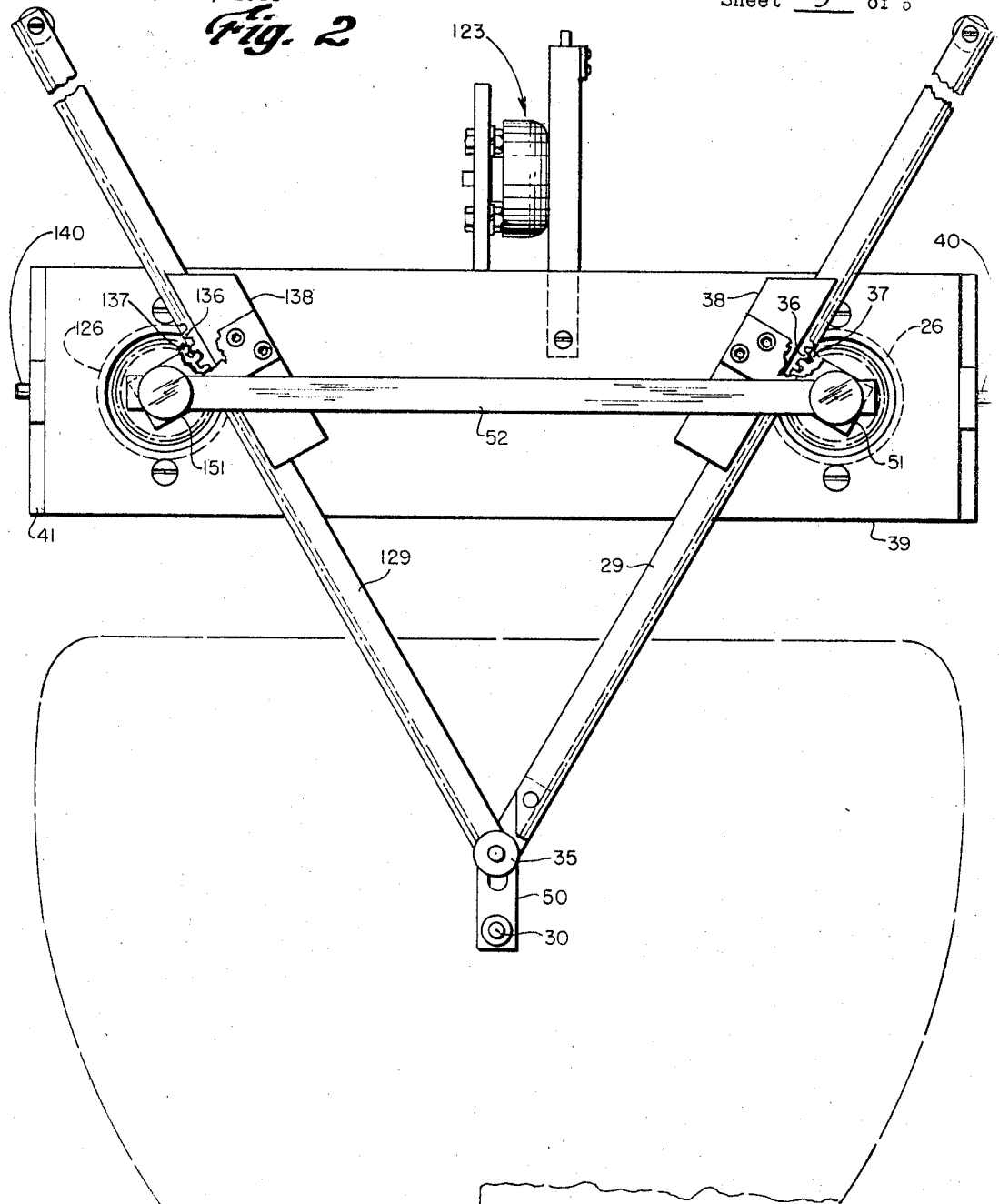

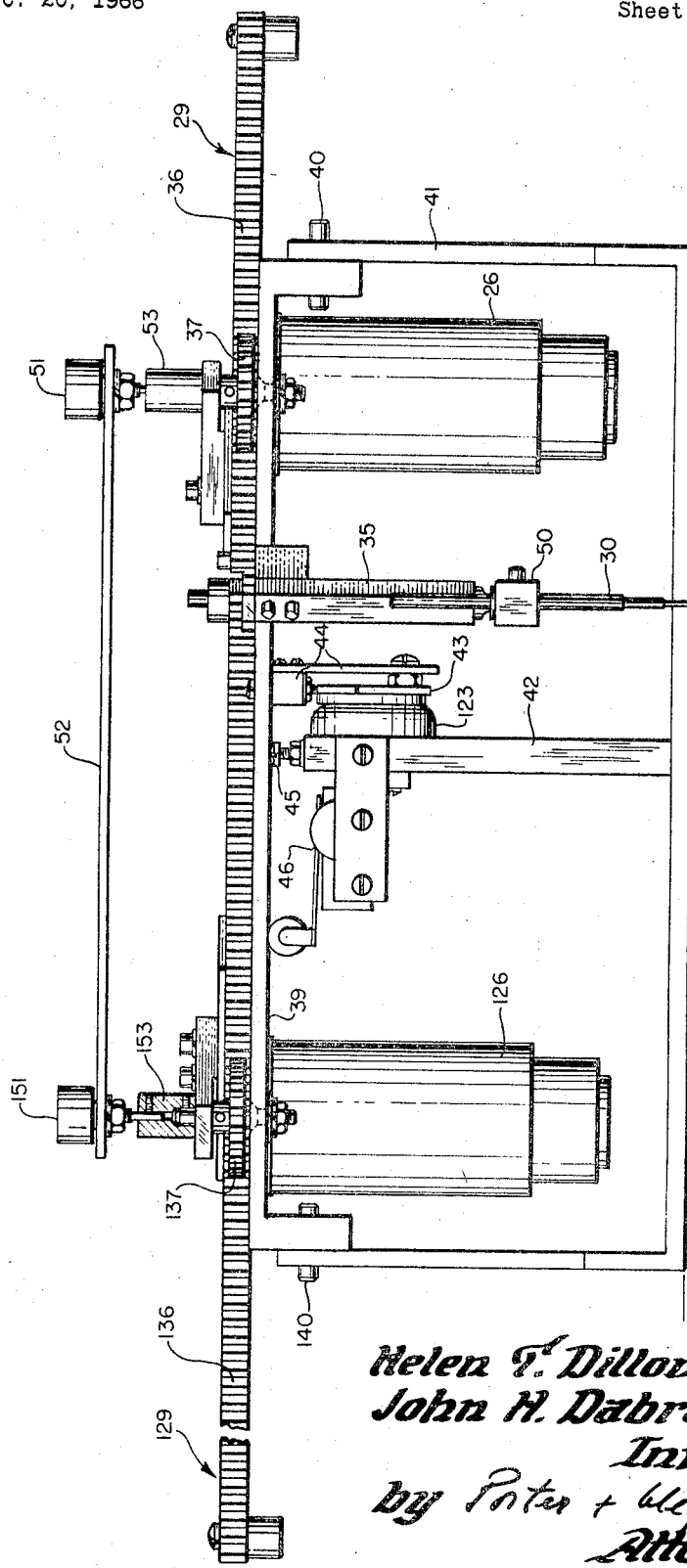

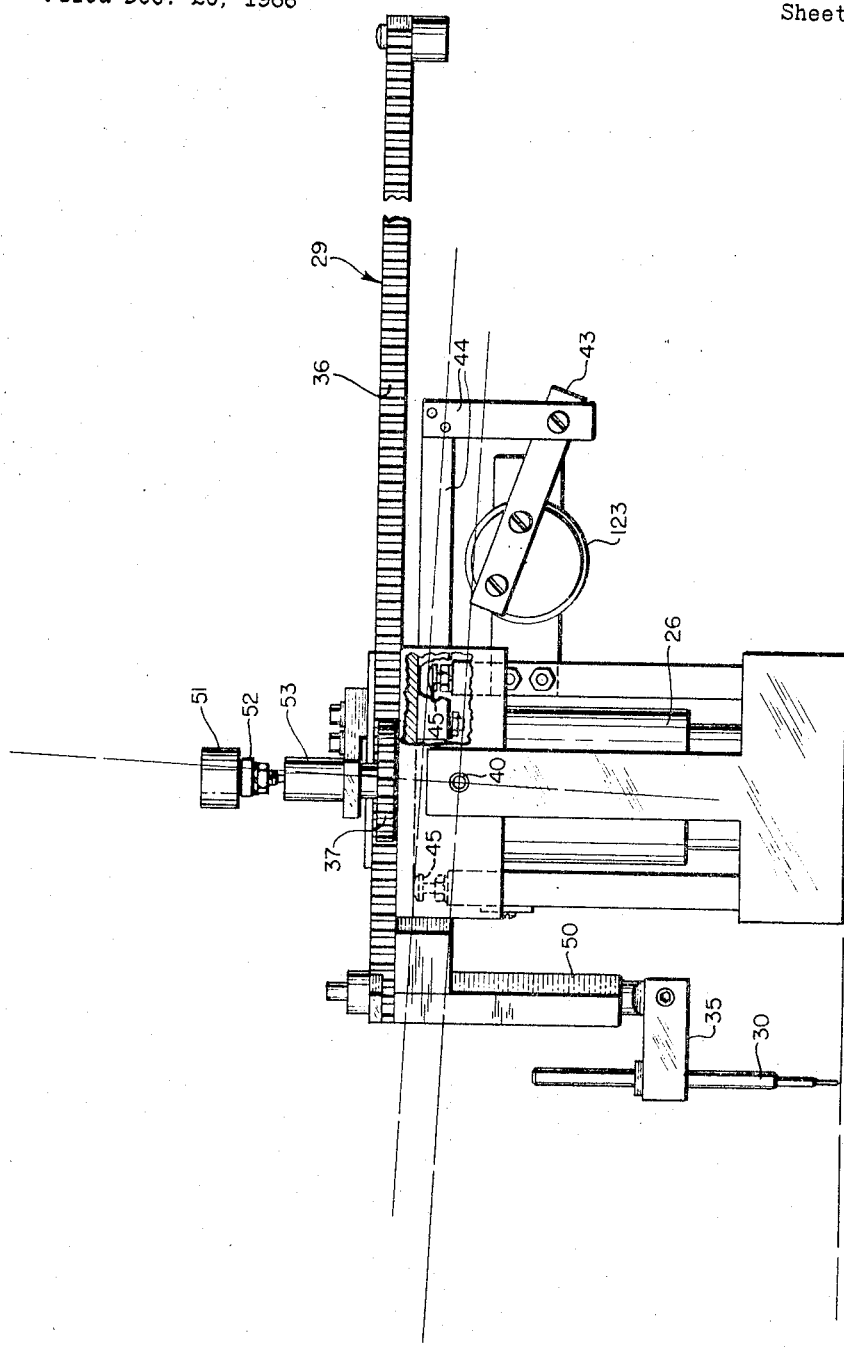

3,425,140
EDUCATIONAL SKILL-BUILDING APPARATUS
Helen T. Dillon, 383 Highland Ave., Malden, Mass. 02148, and John H. Dabrowski, Manomet, Mass.; said Dabrowski assignor to said Dillon
Filed Dec. 20, 1966, Ser. No. 603,354
U.S. Cl. 35—36         8 Claims
Int. Cl. G09b 5/04; G06k 9/00

ABSTRACT OF THE DISCLOSURE

The present invention relates to teaching machines and in particular to apparatus for providing audio, visual and kinesthetic instruction simultaneously. The apparatus of the present invention comprises a stereo tape recorder, a pen adapted for manual operation, a servo system for positioning the pen mechanically, an audio channel with input and output means and an electronic mixing system. The tape records voice instructions and pen positioning information in the record mode. In the playback mode it gives the voice instructions through a speaker or earphone while moving the pen by operation of the servo system. The student holds the pen so that the pen movement is felt kinesthetically while it provide a graphic display.

---

Thus it is an object of the invention to define educational apparatus for giving audio visual and kinesthetic instructions simultaneously.

It is a further object of the invention to define a novel system for recording the movement of a pen and then duplicating the pen movements from the recording.

It is a further object of the invention to define a novel system for recording and playing back an audible signal simultaneously with the recording and playback respectively of the mechanical position movements of a writing device using two recording channels.

It is still a further object of the invention to define a phase sensitive system for record and playback of the mechanical movements of a pen.

Further objects and features of the invention will become apparent upon reading the following description together with the drawings in which:

FIG. 2 is a plan view of a pen positioning assembly in accordance with the invention;

FIG. 3 is a front elevation of the pen positioning assembly of FIG. 2; and

FIG. 4 is a side elevation of the pen positioning assembly of FIG. 2.

While the inventive apparatus can be embodied in a variety of specific forms, one specific embodiment that has proven operative is depicted by the drawings.

Figure 1A:
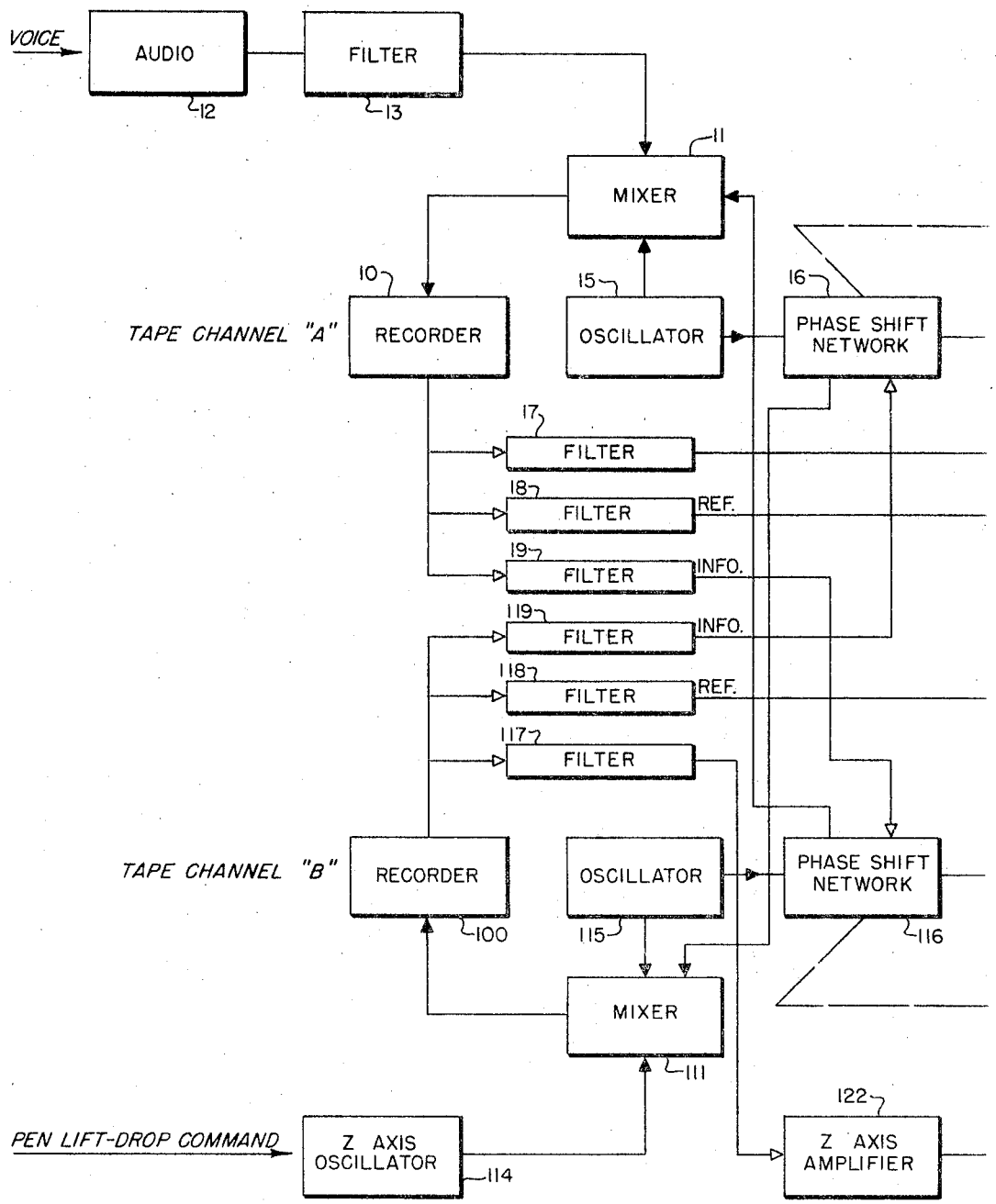
FIGS. 1a and 1b are a functional block diagram of the inventive apparatus.
Figure 1B:
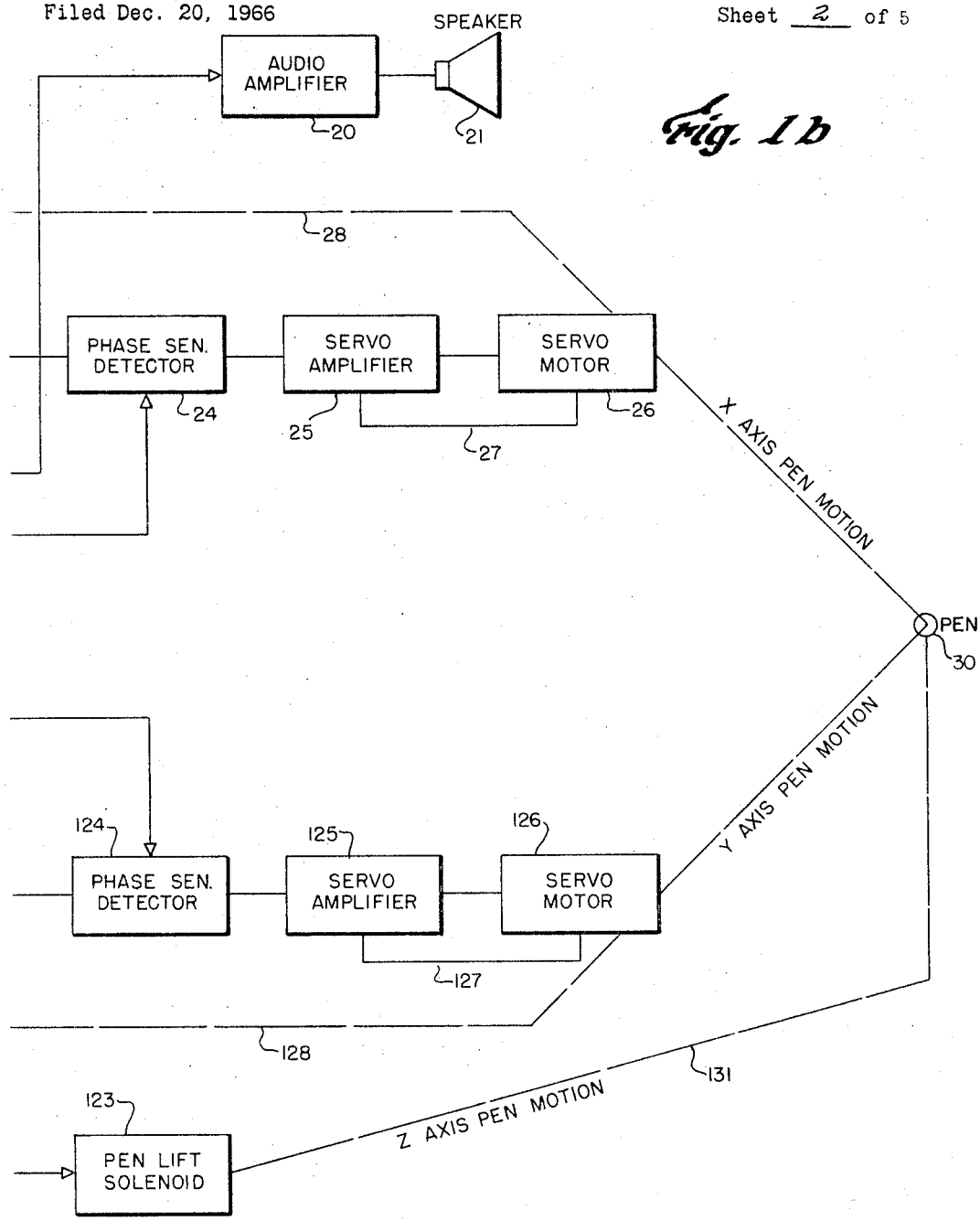

Referring to FIGS. 1a and 1b, this embodiment utilizes a stereo tape recorder with one stereo track represented as recorder 10 and the other stereo track represented as recorder 100. The inputs to each recorder are connected through linear mixers 11 and 111 respectively. Linear mixers 11 and 111 may be merely resistance-capacitance coupling and isolating networks.

Three inputs are provided to each recorder through the respective mixer. Audio input 12, for example, comprising a microphone and audio amplifier, is connected to mixer 11 through bandpass filter 13. Bandpass filter 13 filters out frequencies below and above a normal speaking range. Thus filter 13 may, by way of example, pass a band of 50 to 2500 cycles per second.

One of the three inputs to mixer 111 is a keyed oscillator entitled: Z Axis Oscillator 114, which is keyed on and off by movement of the writing pen in and out of contact with the writing surface. This oscillator may suitably operate at any frequency that is well enough separated from the frequencies of oscillators 15 and 115 so as to enable easy separation by filters. A frequency within the above band of 50 to 2500 cycles per second will normally be suitable.

The second input to mixer 11 is a connection from oscillator 15 and the third input to mixer 11 is a connection from phase-shift network 116. The second and third inputs to mixer 111 are similarly oscillator 115 and phase-shift network 116. Oscillators 15 and 115 operate at frequencies selected to enable easy filter separation from each other and the frequencies of oscillator 114 and the passband of filter 13.

One set of frequencies that has been used is:

Filter 13: 50–2500 c.p.s.
Oscillator 15: 10.5 k.c.p.s.
Oscillator 114: 400 c.p.s.
Oscillator 115: 5.4 k.c.p.s.

In the absence of non-linear mixing effects it is adequate to keep the frequencies well enough separated for easy filtering and within the passband of the recorder. Oscillator 114 may be overlapped by the passband of filter 13 since the outputs of each are recorded on separate tracks.

The output of each recorder 10 and 100 is connected to three bandpass filters, 17, 18, 19 and 117, 118, 119 respectively. Each filter is tuned to the frequency of one of the input signals. Filter 17, tuned to the same frequency as filter 13, is connected to audio amplifier 20 in FIG. 1b. Audio amplifier 20 is connected to drive a speaker or other audio transducer 21.

Filter 117, tuned to the frequency of oscillator 114 is connected to Z Axis Amplifier 122 driving Pen Lift Solenoid 123 in FIG. 1b. Filter 18, tuned to oscillator 15, is connected to phase detector 24. Filter 19, tuned to the frequency of oscillator 115, is connected to phase-shift network 116.

Filter 118, tuned to the frequency of oscillator 115, is connected to phase detector 124. Filter 119, tuned to the frequency of oscillator 15, is connected to phase-shift network 16.

Phase-shift network 16 is connected to phase sensitive detector 24 of conventional design. Phase sensitive detector 24 is connected to servo amplifier 25 which in turn is connected to servo motor 26. A feedback loop 27 is provided in a conventional manner to dampen hunting of motor 26.

Servo motor 26 is mechanically connected to a phase varying component of network 16. This mechanical connection is indicated by dash line 28.

One suitable form for network 16 is a transformer with a resistance-capacitance network on the secondary winding for introducing phase-shift. Either a variable capacitor or resistor forming part of the network can be mounted on the servo motor to vary with rotation of the motor. Multiple turn resistors are readily available to allow for plural rotations of the servo motor. Otherwise a gearing arrangement can be used. Servo motor 26 is connected to a rack arm 29 (FIG. 2) supporting pen 30 to provide one planar coordinate. This connection is depicted by a dashed line entitled "X Axis Pen Motion."

The second servo train starting with phase-shift network 116 and ending with rack arm 129 will not be described in detail since it merely duplicates that described above. The second servo train provides the second planar coordinate required for a unique pen position. Pen lift solenoid 123 is connected to provide a third dimension of pen movement in and out of contact with a writing surface. The mechanical connection for this is depicted by dashed line 131 entitled "Z Axis Pen Motion."

Before describing the detailed operation, an exemplary mechanical assembly for pen positioning will be described with reference to drawing FIGS. 2 through 4.

Writing pen 30 is mounted in a support 35 which is secured rigidly to rack arm 29 and pivotally to rack arm 129. Rack arm 29 carries a rack gear 36 held in engagement with pinion gear 37 by a guide housing 38. Pinion gear 37 is mounted for rotation on the shaft of servo motor 26. Rack arm 129 is arranged similarly with respect to servo motor 126. The diameter of gear 37, the length of rack arms 29 and 129 and the maximum number of revolutions allowed servo motors 26 and 126 (can be only one) are determined by the size of the writing surfaces to be utilized and the writing precision required. Servo motors 26 and 126 and rack arms 29 and 129 are mounted on a supporting platform 39 which is supported by gimbals 40 and 140 from a frame 41.

Platform 39 tilts on gimbals 40 and 140 to move pen 30 in and out of contact with a writing surface. A solenoid actuator 123 is supported from frame 41 by an upright support 42. Solenoid actuator 123 depicted as a rotary solenoid is connected to platform 39 by a linkage 43 and connecting arms 44.

An adjustable screw 45 on support 42 adjusts the writing position of pen 30. The "up" or non-writing position of pen 30 is non-critical and is controlled manually and by solenoid 123 in the record and playback modes repsectively.

A switch 46 mounted on support 42 carries a switching lever in contact with platform 39. In the record mode, manual up and down (Z axis) movement of the pen operates this switch to key oscillator 114. Pen 30 is mounted in support 35 by a holding device 50. Holding device 50 is arranged to allow the pen to be hand held and operated in approximately the conventional writing manner. As depicted, pen 30 is supported by device 50 in a rigid vertical position. Since some slant is commonly used for writing, it is contemplated to modify device 50 so as to adjust such slant, by mounting support 35 on a swivel joint. In either case it will be recognized that the relative rigidity applied to the angular position of the pen with respect to the writing surface is preferential for good writing, i.e. this tends to overcome the exhaustive over-use of finger movement.

Two potentiometers 51 and 151 are depicted mounted on the shafts of servo motors 26 and 126 by means of coupling collars 53 and 153. A bar 52 connecting potentiometers 51 and 151 prevents the potentiometer cases from turning as their shafts are turned by servo motors 26 and 126.

Operation will now be described: first in relation to the record mode and second with relation to the playback mode.

In the record mode, the recorder outputs to filters 17 to 19 and 117 to 119 (FIG. 1) are all switched off as indicated by the open arrows. The three inputs to each recorder are switched on the oscillator inputs to the phase-shift networks are switched on all as indicated by the solid arrows.

Instructions are recorded by voice through audio input 12 and are fed through mixer 11 into recorder 10.

The pen can be operated to record writing movements simultaneously with recording of voice instructions. Movement of pen 30 against and away from the writing surface actuates switch 46 (FIG. 3) keying oscillator 114 on and off. For example, lifting pen 30 away from the writing surface can key oscillator 114 "ON." The output signal of oscillator 114 at a predetermined frequency, i.e. 400 cycles per second, is then recorded by recorder 100.

Movement of pen 30 in a writing or drawing motion on the writing surface moves rack arms 29 and 129 rotating servo motors 26 and 126. Rotation of servo motors 26 and 126 varies potentiometers 51 and 151. Variation of potentiometers 51 causes phase-shifting of the signal from oscillator 15 which signal is then fed from network 16 through mixer 111 into recorder 100.

Variation of potentiometer 151 causes phase-shifting of the signal from oscillator 115 which signal is then fed from network 116 through mixer 11 into recorder 10. These phase-shifted signals carry the information of the planar movements of pen 30.

The unshifted signal from oscillator 15 is recorded as a reference by recorder 10 and the unshifted signal from oscillator 115 is recorded as a reference by recorder 100.

Thus recorder 10 records the audio, the reference frequency from oscillator 15 and the phase-shifted information signal from network 116. Recorder 100 records the lift-drop signal of oscillator 114, the reference frequency from oscillator 115 and the phase shifted information signal from network 16.

As has been previously stated, recorders 10 and 100 are actually the two signal channels of a single stereo recorder. It would be extremely difficult to avoid the loss of vital phase information if the reference and information signals were recorded on separate tapes driven by separate motors.

In playback the recorder inputs are switched off as are the outputs from oscillators 15, 114 and 115. The recorder outputs are switched on into filters 17 to 19 and 117 to 119.

The recorded information is in frequency multiplex and the filters 17 to 19 and 117 to 119 separate the signals. Thus in playback, filter 17 separates the audio from recorder 10 and applies it to drive audio amplifier 20 and speaker 21.

Filter 117 separates the frequency of oscillator 114 from recorder 100 and applies it to amplifier 122 to drive solenoid 123.

Filter 18 separates the reference signal of oscillator 15 and applies it to detector 24. Filter 119 separates the phase-shifted information signal of oscillator 15 applying it through phase-shift network 16 to detector 24.

Detector 24 compares the relative phase of the recorded reference and information signals to drive amplifier 25 and motor 26. Servo motor 26 drives potentiometer 51 so as to provide a null when rack arm 29 reaches the correct position.

The output of filters 118 and 19 operate in the manner described above to operate servo motor 126 and rack arm 129.

The audio and Z-axis channels are straightforward. The mixers are linear such that harmonics are not generated in the mixing process which would upset the other channels. The coordinate drives, however, are unconventional. Due to the precision required of the pen motion, the phase-modulated frequency multiplex system was conceived. In this system, each channel uses a fixed frequency carrier generated by an oscillator. Information is recorded on the tape as the relative phase between the oscillator signal and that produced from the phase-shift network, both of which are recorded on different tape tracks. For playback, both phase channels are compared in a phase sensitive detector. The servo motors drive the phase-shift networks to null the output of the detectors. The filter networks are used solely to channel the frequency carriers into the proper networks.

While the invention has been described in relation to a specific embodiment, a number of variations are contemplated. For example, instead of phase modulation for pen positioning information, amplitude modulation and frequency modulation systems can readily be designed. Even a direct current signal is usable, although generally it is more difficult to handle with the required accuracy unless chopping or similar techniques are used.

Also the coordinate system used may be orthogonal or even a polar system in a plane. Generally any two-coordinate system that yields a unique planar position is usable.

While the invention has been described in relation to single combined record and playback apparatus, it is contemplated that multiple playback units can be operated from a single tape playback simultaneously.

In one contemplated embodiment, the recorder is bypassed or omitted completely and a master unit operated by an instructor, feeds its pen position and audio information directly into the phase detectors and amplifiers of the multiple playback units.

Thus it is intended to claim the invention broadly within the spirit and scope of the appended claims.

We claim:

1. Skill-building apparatus comprising means to mechanically position a writing device adapted for manual manipulation and means to record in playback positional movements of said writing device while grasped in a person's hand, said means to mechanically position comprising first and second servo systems each providing one coordinate of a discrete planar position and mechanical means driven by said servo systems for supporting said writing device, each of said first and second servo systems comprising a phase shifting network, a phase sensitive detector connected to said network, a servo amplifier connected to said detector, a servo motor connected to said amplifier and means operatively connected to said servo motor for varying the phase-shift of said network whereby phase variations in a recorded signal can be played back through said network and detected by said detector so as to drive said servo amplifier and servo motor until said means for varying the phase-shift nulls the output of said detector.

2. Skill-building apparatus according to claim 1 in which said means to record and playback comprises a stereo recorder having at least a first channel and a second channel, a first oscillator operative at a first frequency connected to record on said first channel, a second oscillator operative at a second frequency connected to record on said second channel, connections from said first oscillator and said second oscillator to said phase shifting networks of said first and second servo systems repectively, and connections from said phase shifting networks of said first and second servo systems to said stero recorder for recording on said second and first channel respectively whereby reference and phase-shifted signals for each servo system are recorded by opposite channels of the stereo recorder in frequency multiplex.

3. Skill-building apparatus according to claim 2 in which the output of said first and second channels is filtered for the frequencies of said first and second oscillators respectively and connected to the detectors of said first and second servo systems respectively, the output of said first and second channels is separately filtered for the frequencies of said second and first oscillators respectively and connected through the phase shift networks to the detectors of said second and first servo systems respectively whereby said detectors detect the phase of the recorded phase-shifted signals relative to the unshifted signals for driving said first and second servo systems in playback.

4. Educational apparatus adapted to give audio, visual and kinesthetic instructions simultaneously comprising:
 (a) means to simultaneously record audio signals and signals representative of the movements of a writing device;
 (b) means to reproduce said audio signals;
 (c) means for supporting a writing device arranged to permit hand-holding of such device in a usual manual writing grasp; and
 (d) means driving said means for supporting to reproduce said movements simultaneously with reproduction of said audio signals, whereby audio instruction can be given by said means to reproduce said audio signals and both visual and kinesthetic instructions are given by mechanical movement of a writing device operated by said means for supporting while being grasped by the hand of a student.

5. Educational apparatus according to claim 4 in which said means to record is a stereo recorder connected to record voice, phase modulated information of said writing device movement along a first coordinate axis, phase modulated information of said writing device movement along a second coordinate axis, lift and drop signals relative to the movement of said device in and out of writing contact, and phase reference signals on the two stereo tracks simultaneously.

6. Educational apparatus according to claim 5 in which said means to record comprises frequency carriers adapted to frequency multiplex the recorded signals and bandpass output filters for separating the output signals to the means to reproduce said audio signals and to said means driving in accordance with the respective coordinate axes and the lift-drop signals.

7. Educational apparatus according to claim 4 in which said means for supporting a writing device is two geared rack arms one of which is secured rigidly and the other of which is secured pivotally to a pen support such that any coordinated positioning of said arms provides a unique planar position for said writing device.

8. Educational apparatus according to claim 4 in which said means driving comprises two servo systems each having a servo motor the rotational position of which determine a planar coordinate.

References Cited

UNITED STATES PATENTS 1,883,204  10/1932  Whitaker.

WILLIAM H. GRIEB, *Primary Examiner.*